F. W. PEEK, Jr.
ELECTROLYTE FOR ALUMINUM CELLS.
APPLICATION FILED FEB. 5, 1909.
1,008,860.
Patented Nov. 14, 1911.
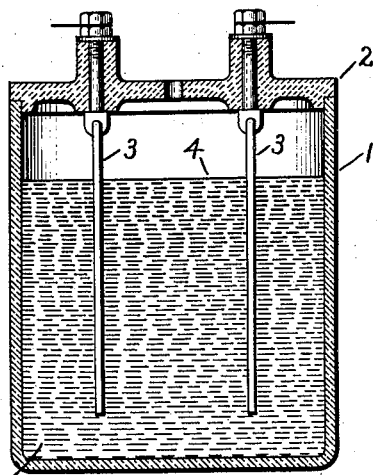
Electrolyte containing a borate and a tartrate.
Witnesses:
Earl G. Klock.
J. Ellis Glen.
Inventor:
Frank W. Peek, Jr.
by
His Attorney.

UNITED STATES PATENT OFFICE.

FRANK W. PEEK, JR., OF SCHENECTADY, NEW YORK, ASSIGNOR TO GENERAL ELECTRIC COMPANY, A CORPORATION OF NEW YORK.

ELECTROLYTE FOR ALUMINUM CELLS.

1,008,860.  Specification of Letters Patent.  Patented Nov. 14, 1911.

Application filed February 5, 1909. Serial No. 476,268.

*To all whom it may concern:*

Be it known that I, FRANK W. PEEK, Jr., a citizen of the United States, residing at Schenectady, county of Schenectady, State of New York, have invented certain new and useful Improvements in Electrolytes for Aluminum Cells, of which the following is a specification.

My invention relates to electrolytic cells of the aluminum type, and merely for purposes of illustration, I have shown diagrammatically, in the accompanying drawing, one of the many forms of electrolytic cells in which my invention may be embodied, and in which a vessel 1 is provided with a cover 2 on which electrodes 3 are mounted to project into the electrolyte 4. As is well known, cells of this type consist essentially of electrodes, at least one of which is aluminum, and a suitable electrolyte. When a cell of this kind is included in an electric circuit, and the aluminum electrode is made the anode, a thin film is formed upon its surface, which checks the flow of current through the cell. When both the electrodes consist of aluminum and the cell is included in an alternating-current circuit it acts as a condenser, the electrode films serving as dielectreses. If the voltage impressed upon the cell exceeds a certain critical breakdown voltage the insulating property of the film is broken down and a free discharge of current takes place through the cell. The breakdown voltage of a film depends upon several factors, the most controlling of which is the character of the electrolyte. Should the cell be open-circuited for some length of time, the insulating property of the film is impaired, possibly because of the dissolving effect on the part of the electrolyte, and it requires a further passage of current to restore its insulating property.

According to my invention, I employ as electrolyte in cells of this character a solution consisting of a mixture of borates and tartrates, to which I add in some instances a certain amount of glycerin. The glycerin when added to a neutral solution of the above mixture of salts appears to react in some manner, as the solution becomes acid. According to a modification of my invention, the solution is once more neutralized entirely, or in part, after the addition of the glycerin.

Solutions of borates, such, for example, as ammonium borate, exert but a slight dissolving effect upon the film, and their properties in other respects render them desirable as electrolytes for this class of cells. When, however, an aluminum cell containing a solution of a borate as electrolyte has been in continuous operation for some time a deposit forms upon the plate, which impairs its efficiency. This deposit may be the product of electrochemical action occurring on the cell when included in the circuit. I have found, however, that a deposit is formed in some cases even when the cell is not included in a circuit by the freezing of the electrolyte, and it may be caused even by the cooling of the electrolyte to a point near the freezing temperature. It is especially marked near the surface of the electrolyte, where it may be started by evaporation of the solvent. No matter how it is formed, the deposit exerts a harmful action on the aluminum plates when a current is passing through the cell during its normal operation as a rectifier, lightning arrester or condenser. I have discovered that the growth of this deposit can be suppressed for the greater part by the addition of tartrates to the electrolyte, and even when a deposit is formed in an electrolyte containing tartrates its injurious effect on the plates is not as marked. Furthermore, the addition of the tartrate also has the effect of improving the character of the film both in cutting down the leakage current, which ordinarily passes through the cell when in circuit, and also in raising the critical or breakdown voltage of the same. I have also found that the presence of a tartrate in the electrolyte reduces its resistance.

When making up my solution I can, for example, begin with a mixture of boric or tartaric acids and using, for example, six parts boric acid and one of tartaric acid, and then adding an alkali to neutralize the acids. For this purpose a solution of ammonium, potassium, or sodium hydroxid can be used. It will, of course, be understood that it is not absolutely necessary to attain the exact neutral point, as a slight excess of acid or alkali is not injurious. Instead of starting with the boric acid, which when neutralized forms the normal borate, I may use the tetraborate, which is more stable. According to my present opinion, there is probably formed by interaction of the borates and tartrates a complex salt, which may be termed a borotartrate. As already indicated, I add to this electrolyte, in some cases, a small amount of glycerin, for example, about 10%. The addition of the glycerin will cause the mixture, which formerly was neutral, to react acid. It is not unlikely that this effect is due to the oxidation on the part of the glycerin to form an organic acid. However, my invention may be practiced irrespective of any theory, by carrying out the successive steps as described above.

According to a modification of my invention, the electrolyte is again neutralized, or partly neutralized, after the addition of the glycerin by adding, for example, a solution of ammonium hydroxid. The neutralization is accompanied by the generation of heat and the liberation of gases.

I do not claim broadly in my present application the use of glycerin in an electrolyte with subsequent neutralization of the acid formed thereby, as I intend to claim the same in another application.

What I claim as new, and desire to secure by Letters Patent of the United States, is,—

1. In an electrolytic cell, the combination of electrodes and an electrolyte, consisting essentially of a solution of a borate and a tartrate.

2. In an electrolytic cell of the aluminum type, the combination of electrodes and an electrolyte containing a mixture of salts, one of which is a tartrate and another is a borate.

3. In an electrolytic cell, the combination of electrodes and an electrolyte, consisting of a solution of borates and tartrates of ammonium.

4. In an electrolytic cell, the combination of electrodes and an electrolyte, consisting of borates, tartrates and glycerin.

5. In an electrolytic cell, the combination of electrodes and an electrolyte, consisting of a neutral solution of borates, tartrates and glycerin.

6. In an electrolytic cell of the aluminium type, an electrolyte consisting essentially of a solution of a borate and a tartrate of an alkali in the proportion of about six to one respectively.

In witness whereof, I have hereunto set my hand this 4th day of February, 1909.

FRANK W. PEEK, Jr.

Witnesses:
MARGARET E. WOOLLEY,
HELEN ORFORD.